United States Patent [19]

Phillips

[11] Patent Number: 5,031,575
[45] Date of Patent: Jul. 16, 1991

[54] ANIMAL FOOD DISH

[76] Inventor: Don H. Phillips, Rte. 10, Box 629A, Fort Worth, Tex. 76135

[21] Appl. No.: 569,403

[22] Filed: Aug. 17, 1990

[51] Int. Cl.⁵ ............................................. A01K 5/00
[52] U.S. Cl. ................................................... 119/61
[58] Field of Search ................... 119/61, 51.5; 206/514

[56] References Cited

U.S. PATENT DOCUMENTS

| | | | |
|---|---|---|---|
| 2,584,301 | 2/1952 | Sinclair | 119/61 |
| 2,677,350 | 5/1954 | Prestidge et al. | 119/61 |
| 4,007,711 | 2/1977 | Michael | 119/51.5 |
| 4,128,080 | 12/1978 | Haney | 119/51.5 |
| 4,357,905 | 11/1982 | Carpenter | 119/51.5 |
| 4,399,772 | 8/1983 | Salinas | 119/51.5 |
| 4,803,954 | 2/1989 | Welch et al. | 119/61 |
| 4,896,627 | 1/1990 | Riddell | 119/51.5 |
| 4,955,321 | 9/1990 | Waldner | 119/61 |

FOREIGN PATENT DOCUMENTS

| | | | |
|---|---|---|---|
| 0738069 | 12/1932 | France | 119/61 |
| 0821389 | 12/1937 | France | 119/61 |

Primary Examiner—Robert P. Swiatek
Assistant Examiner—Todd E. Manahan
Attorney, Agent, or Firm—Charles D. Gunter, Jr.

[57] ABSTRACT

An animal food dish is shown for preventing crawling insects from contaminating food in the dish. The dish includes a base having a bottom wall and generally vertically extending inner sidewall which defines an open interior for the base. The base also has a generally vertically extending outer sidewall which surrounds the inner sidewall and which is spaced-apart from the inner sidewall to define a moat cavity which extends about the inner sidewall in circumferential fashion. A food bowl is received within the open interior of the base and has a bottom wall and connecting sidewall, the connecting sidewall having a top region which terminates in an outwardly extending, peripheral flange which covers the open top of the moat when the food bowl is received within the open interior of the base. Locking ribs located on the food bowl and base are provided to locate and engage the food bowl within the base.

9 Claims, 1 Drawing Sheet

ANIMAL FOOD DISH

BACKGROUND OF THE INVENTION

1. Field of the Invention

The present invention relates generally to animal feeders and, specifically, to such feeders which protect the feed from crawling insects such as ants.

2. Description of the Prior Art

Various animal feeders are known which are used both indoors and outdoors for feeding pets and livestock. In the case of an indoor feeder, the feeder is usually placed on the floor adjacent an external wall were it is susceptible to infestation by crawling insects, such as ants, which have a propensity for seeking a supply of food. These insects not only contaminate the pet food but also pose problems within human dwelling places. In the case of outdoor feeders, for example of the type use to feed dogs, the feed can quickly become infested with crawling insects. The spoiled feed will then usually be rejected by the dog, thereby constituting a considerable source of waste. If eaten, the contaminated food can be a source of illness or disease.

The present invention has as its object to provide a simple and economical animal food dish which protects the animal's food from ground crawling insects.

Another object of the invention is to provide such an animal food dish which can be produced relatively inexpensively so as to be sold at a competitive price with existing food dishes.

Another object of the invention is to provide an animal food dish with a small number of parts, the parts being susceptible to mass production, as by an injection molding process from a synthetic plastic material.

Another object of the invention is to provide an animal food dish which includes a moat for surrounding the food and preventing crawling insects from contaminating the food, the moat being covered in use to prevent spilling of the animal food into the liquid contained within the moat.

Another object of the invention is to provide a two-component animal food dish in which a food bowl is separable from an associated base to facilitate both the filling and cleaning of the components of the dish.

Another object of the invention is to provide an improved fastening means for securing the food bowl within the associated dish to prevent spillage of food.

SUMMARY OF THE INVENTION

The animal food dish of the invention is designed to prevent crawling insects from contaminating food in the dish. The food dish includes a base having a bottom wall and a generally vertically extending inner sidewall which defines an open interior for the base. The base also has a generally vertically extending outer sidewall which surrounds the inner sidewall, the outer sidewall being spaced-apart from the inner sidewall to define a moat cavity which extends about the inner sidewall in circumferential fashion, the moat cavity having an open top. A food bowl is adapted to be received within the open interior of the base. The food bowl has a bottom wall and a connecting sidewall. The connecting sidewall has a bottom region and a top region which terminates in an outwardly extending, peripheral flange which is arranged to cover the open top of the moat cavity when the food bowl is received within the open interior of the base. Preferably, the peripheral flange of the food bowl extends horizontally outward from the top region of the connecting sidewall to completely cover the open top of the moat cavity in use.

The animal food dish is also preferably provided with fastening means which can comprise a plurality of spaced-apart positioning ribs extending in a horizontal plane from the inner sidewall of the base. A plurality of mating locking ribs are provided which extend in a horizontal plane from the connecting sidewall of the food bowl. The locking ribs are positioned at a lower relative vertical position on the connecting sidewall of the food bowl than the vertical position of the positioning ribs on the base, whereby the locking ribs of the food bowl are moveable between locked and unlocked positions with respect to the positioning ribs of the base by rotating the locking ribs into and out of registration with the positioning ribs, respectively. At least one stop member can be provided which extends downwardly from the positioning ribs within the open interior of the base for limiting rotational movement of the food bowl within the open interior of the base as the locking ribs are engaged with the mating positioning ribs.

Additional objects, features and advantages will be apparent in the written description which follows.

DETAILED DESCRIPTION OF THE INVENTION

Figure 1:
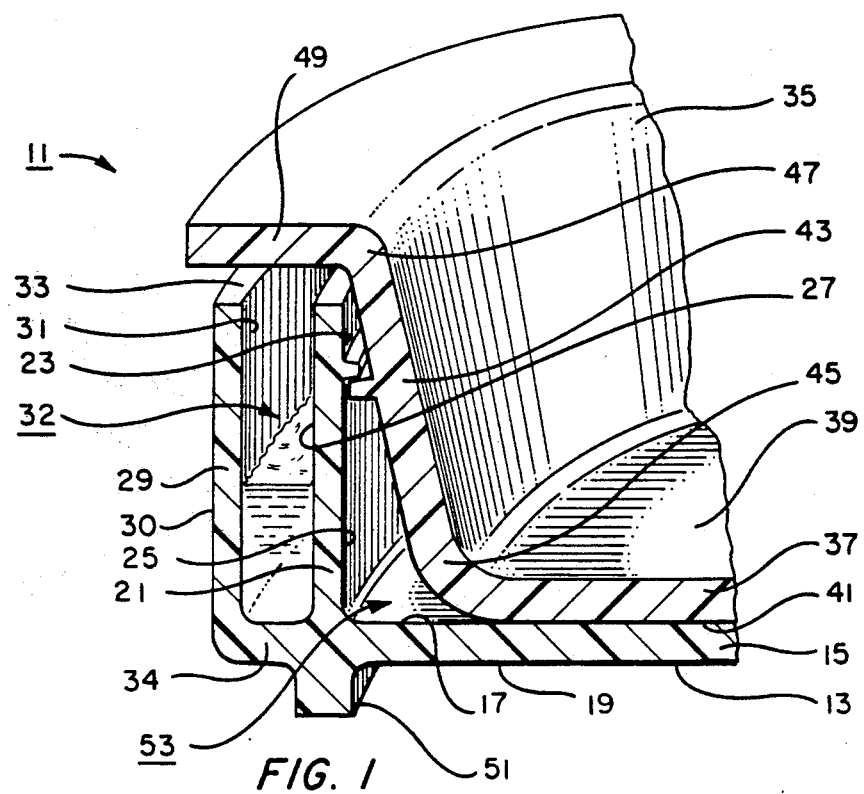
FIG. 1 is a partial, cross-sectional view of the animal food dish of the invention showing the assembled food bowl locked within the open interior of the surrounding base.
Figure 2:
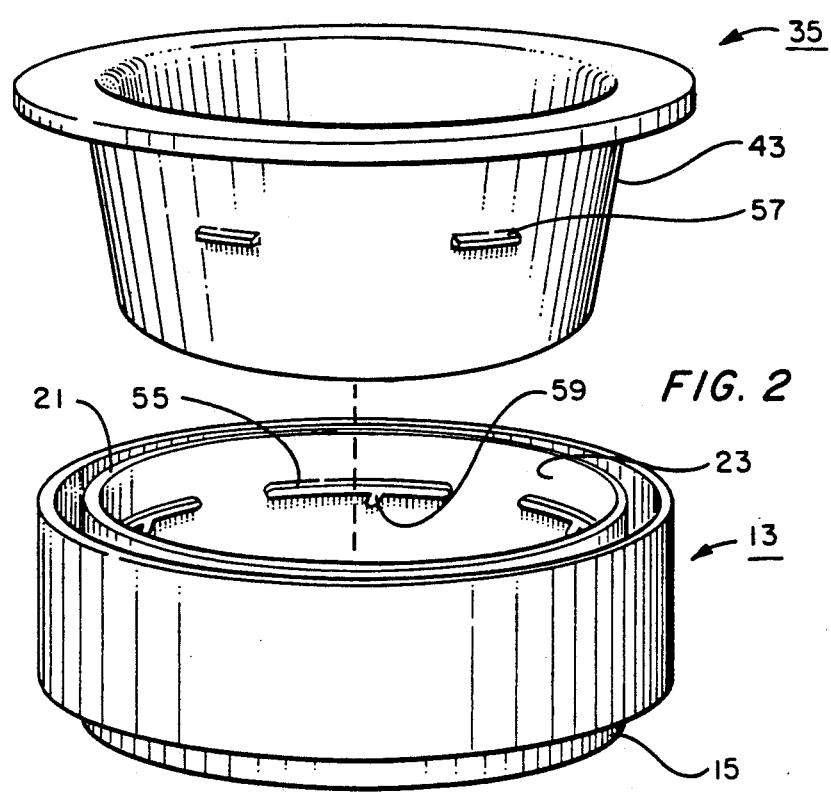
FIG. 2 is an exploded, perspective view of the animal food dish of the invention showing the assembly of the food bowl within the open interior of the surrounding base.

FIG. 1 is a partial, sectional view of an animal food dish of the invention designated generally as 11. The food dish 11 includes a base 13 having a bottom wall 15 with an upper surface 17 and a lower surface 19. The base 13 also has a generally vertically extending inner sidewall 21 which defines an open interior 23 for the base. The vertically extending inner sidewall 21 has an interior surface 25 and an exterior surface 27.

The base 13 also has a generally vertically extending outer sidewall 29 which surrounds the inner sidewall 21. The outer sidewall 29 is spaced-apart from the inner sidewall 21 and has an outer sidewall 30 and inner sidewall 31 which together define a moat cavity 32. The moat cavity 32 extends about the inner sidewall 21 in circumferential fashion. As best seen in FIG. 1, the moat cavity 32 has an open top 33.

The inner sidewall 21 of the base 13 connects with the bottom wall 15 of the base 13 in generally perpendicular fashion. The outer sidewall 29 connects to the inner sidewall 21 by a lower wall 34, whereby the exterior of the inner sidewall 27 forms an inner wall of the moat cavity 32, the inner sidewall, lower wall 34 and outer sidewall forming a generally U-shaped configuration when viewed in cross-section.

The base 13 can also be provided with a depending support such as the cylindrical support ring 51 formed as a part of the exterior surface 19 of the base bottom wall 15 to prevent the base bottom wall from resting on the ground or surrounding terrain.

The moat cavity 32 can be filled with any liquid which is effective to prevent the ingress of crawling insects to the open interior 23 of the base 13. The preferred liquid medium is water. However, it will be understood that the liquid could be any insect repelling liquid since, as will be explained, the open top 33 of the moat is covered during use.

The animal food dish 11 also includes a food bowl 35 which is adapted to be received within the open interior 23 of the base 13. The food bowl 13 has a bottom wall 37 with an interior surface 39 and an exterior surface 41 and has a connecting sidewall 43. The connecting sidewall 43 has a bottom region 45 and a top region 47, the top region 47 terminating in an outwardly extending, peripheral flange 49 which extends horizontally outward from the top region 47 of the connecting sidewall 43 to cover the open top 33 of the moat cavity in use.

The base open interior 23 is generally cylindrical in the preferred embodiment, with the food dish 35 having a generally frusto-conical exterior which is closely received within the open interior 23 of the base 13 in the assembled position shown in FIG. 1. In the assembled position, the connecting sidewall 43 of the food bowl 35 tapers outwardly from the bottom region 45 to the top region 47 thereof, whereby a void space (illustrated generally a 53 in FIG. 1) is created between the connecting sidewall 43 of the food dish 35 and the inner sidewall 21 of the base 13.

Fastening means are preferably provided for securing the base 13 to the food bowl 35. The fastening means can conveniently comprise a plurality of spaced-apart positioning ribs 55 extending in a horizontal plane from the inner sidewall 21 of the base 13 and a plurality of mating locking ribs 57 extending in a horizontal plane from the connecting sidewall 43 of the food bowl 35. The locking ribs 57 are preferably positioned at a lower relative vertical position on the connecting sidewall 43 of the food bowl 35 than the vertical position of the positioning ribs 55 on the base 13, whereby the locking ribs 57 of the food bowl 35 are moveable between locked and unlocked positions with respect to the positioning ribs 55 of the base 13 by rotating the locking ribs 57 into and out of registration with the positioning ribs 55, respectively.

At least one stop member 59 extends downwardly from each positioning rib 55 within the open interior 23 of the base 13 for limiting rotational movement of the food bowl 35 within the open interior 23 of the base 13 as the locking ribs 57 are engaged with the mating positioning ribs 55. Preferably, each positioning rib 55 is provided with a stop member 59.

In operation, the moat cavity 32 is first filled with a liquid, such as water and the food bowl 35 is then inserted within the open interior 23 of the base 13. The food bowl 35 is lowered downwardly until the locking ribs 57 pass between the spaces located between the positioning ribs 55, thereby allowing the food dish 35 to be lowered and rotated within the open interior 23 of the base 13. Once the locking ribs 57 are located beneath the positioning ribs 55 with the locking ribs 57 contacting the stop members 59, the assembly is complete. The animal's food can then be placed within the interior of the food bowl 35 without danger of contamination by crawling insects attempting to cross the liquid within the open interior 31 of the moat.

An invention has been provided with several advantages. The animal food dish of the invention is simple in design and economical to manufacture. The food dish can conveniently be formed from a synthetic plastic material which is injection molded. Because the horizontal flange of the food bowl covers the circumferential moat provided as a part of the base, the animal's food never contacts the liquid contained in the moat cavity, thereby preventing spoilage of the food, unpleasant odors and the possibility of disease or infection. The fastening means provides a cooperative engagement between the food bowl and base to prevent the food bowl from being dislodged, allowing spillage of the animal's food. The overall design of the food dish is that of concentric bodies having a low profile center of gravity with the liquid contained in the circumferential moat serving to further stabilize the base and prevent overturning of the food dish. The food dish can be easily and quickly disassembled for cleaning. The sidewalls of the food bowl taper outwardly from bottom to top, providing the animal greater accessibility to the food bowl interior and lessening the chance of food spoilage.

While the invention has been shown in only one of its forms, it is not thus limited but is susceptible to various changes and modifications without departing from the spirit thereof.

I claim:

1. An animal food dish for preventing crawling insects from contaminating the food in the dish, the food dish comprising in combination:

a base having a bottom wall and a generally vertically extending inner sidewall which defines an open interior for the base, the base also having a generally vertically extending outer sidewall which surrounds the inner sidewall, the outer sidewall being spaced-apart from the inner sidewall to define a moat cavity which extends about the inner sidewall in circumferential fashion, the moat cavity having an open top; and a food bowl adapted to be received within the open interior of the base, the food bowl having a bottom wall and a connecting sidewall, the connecting sidewall having an exterior, a bottom region and a top region which terminates in an outwardly extending, peripheral flange which is arranged to cover the open top of the moat cavity when the food bowl is received within the open interior of the base; and fastening means for securing the base to the food bowl, the fastening means including at least one locking member located on the exterior of the connecting sidewall of the food bowl and including at least one cooperating positioning member located on the inner sidewall of the base, the fastening means being movable between locked and unlocked positions by moving the respective locking and positioning members into and out of registration with on another.

2. An animal food dish for preventing crawling insects from contaminating the food in the dish, the food dish comprising the combination;

a base having a bottom wall and a generally vertically extending inner sidewall which defines an open interior of the base, the base also having a generally vertically extending outer sidewall which surrounds the inner sidewall, the outer sidewall being spaced-apart from the inner sidewall to define a moat cavity which extends about the inner sidewall in circumferential fashion, the moat cavity having an open top;

a food bowl adapted to be received within the open interior of the base, the food bowl having a bottom wall and a connecting sidewall, the connecting sidewall having a bottom region and a top region which terminates in an outwardly extending, peripheral flange which is arranged to cover the open top of the moat cavity when the food bowl is received within the open interior of the base;

fastening means for securing the base to the food bowl, the fastening means comprising a plurality of spaced-apart positioning ribs extending in a horizontal plane from the inner sidewall of the base; and a plurality of mating locking ribs extending in a horizontal plane from the connecting sidewall of the food bowl, the locking ribs being positioned at a lower relative vertical position on the connecting sidewall of the food bowl than the vertical position of the position ribs on the base, whereby the locking ribs of the food bowl are movable between locked and unlocked positions with respect to the positioning ribs of the base by rotating the locking ribs into and out of registration with the positioning ribs, respectively.

3. The animal food dish of claim 2 further comprising at least one stop member extending downwardly from the positioning ribs within the open interior of the base, for limiting rotational movement of the food bowl within the open interior of the base as the locking ribs are engaged with the mating positioning ribs.

4. The animal food dish of claim 3, wherein the base has a depending support attached to the base bottom wall to prevent the base bottom wall from resting on the ground.

5. An animal food dish for preventing crawling insects from contaminating the food in the dish, the food dish comprising in combination:

a base having a bottom wall and a generally vertically extending inner sidewall which defines an open interior for the base, the base also having a generally vertically extending outer sidewall which surrounds the inner sidewall, the outer sidewall being spaced-apart form the inner sidewall to define a moat cavity which extends about the inner sidewall in circumferential fashion, the moat cavity having an open top, the outer sidewall being connected to the inner sidewall by a lower wall, whereby the exterior of the inner sidewall forms an inner wall of the moat cavity, the inner sidewall, lower wall and outer sidewall forming a generally U-shape when viewed in cross-section; and a food bowl adapted to be received within the open interior of the base, the food bowl having a bottom wall and a connecting sidewall, the connecting sidewall having an exterior, a bottom region and a top region which terminates in an outwardly extending, peripheral flange which is arranged to cover the open top of the moat cavity when the food bowl is received within the open interior of the base, the food bowl bottom wall resting adjacent the base bottom wall when the food bowl is received within the open interior of the base; and fastening means for securing the base to the food bowl, the fastening means including at least one locking member located on the exterior of the connecting sidewall of the food bowl and including at least one cooperating positioning member located on the inner sidewall of the base, the fastening means being movable between locked and unlocked positions by rotating the respective locking and positioning members into and out of registration with one another, 6. An animal food dish for preventing crawling insects from contaminating the food in the dish, the food dish comprising in combination;

a base having a bottom wall and a generally vertically extending inner sidewall which defines an open interior of the base, the base also having a generally vertically extending outer sidewall which surrounds the inner sidewall, the outer sidewall being spaced-apart from the inner sidewall to define a moat cavity which extends about the inner sidewall in circumferential fashion, the moat cavity having an open top, the outer sidewall being connected to the inner sidewall by a lower wall, whereby the exterior of the inner sidewall forms an inner wall of the moat cavity, the inner sidewall, lower wall and outer sidewall forming a generally U-shape when viewed in cross-section;

a food bowl adapted to be received within the open interior of the base, the food bowl having a bottom wall and a connecting sidewall, the connecting sidewall having a bottom region and a top region which terminates in an outwardly extending, peripheral flange which is arranged to cover the open top of the moat cavity when the food bowl is received within the open interior of the base, the food bowl bottom wall resting adjacent the base bottom wall when the food bowl is received within the open interior of the base;

fastening means for securing the base to the food bowl, the fastening means comprising a plurality of spaced-apart positioning ribs extending in a horizontal plane from the inner sidewall of the base; and a plurality of mating locking ribs extending in a horizontal plane from the connecting sidewall of the food bowl, the locking ribs being positioned at a lower relative vertical position on the connecting sidewall of the food bowl than the vertical position of the positioning ribs on the base, whereby the locking ribs of the food bowl are movable between locked and unlocked positions with respect to the positioning ribs of the base by rotating the locking ribs into and out of registration with the positioning ribs, respectively.

7. The animal food dish of claim 6 wherein the base open interior is generally circular and wherein the food dish has a generally frusto-conical exterior which is closely received within the open interior of the base when the fastening means are in the locked position.

8. The animal food dish of claim 7, wherein the inner sidewall of the base connects with the bottom wall of the base in generally perpendicular fashion within the open interior thereof and wherein the connecting sidewall of the food bowl tapers outwardly from the bottom region to the top region thereof, whereby a void space is created between the connecting sidewall of the food dish and the inner sidewall of the base.

9. An animal food dish for preventing crawling insects from contaminating the food in the dish, the food dish comprising in combination:

a base having a bottom wall and a generally vertically extending inner sidewall which defines an open interior for the base, the base also having a generally vertically extending outer sidewall which surrounds the inner sidewall, the outer sidewall being spaced-apart from the inner sidewall to define a moat cavity which extends about the inner sidewall in circumferential fashion, the moat cavity having an open top;

a food bowl adapted to be received within the open interior of the base, the food bowl having a bottom wall and a connecting sidewall, the connecting sidewall having a bottom region and a top region which terminates in an outwardly extending, peripheral flange which is arranged to cover the open top of the moat cavity when the food bowl is received within the open interior of the base;

fastening means for securing the base to the food bowl, the fastening means comprising a plurality of spaced-apart positioning ribs extending in at least one horizontal plane from the inner sidewall of the base and a plurality of mating locking ribs extending in at least one horizontal plane from the connecting sidewall of the food bowl, the locking ribs being positioned at a different relative vertical position on the connecting sidewall of the food bowl than the vertical position of the positioning ribs on the base, whereby the locking ribs of the food bowl are movable between locked and unlocked positions with respect to the positioning ribs of the base by rotating the locking ribs into and out of registration with the positioning ribs, respectively.

* * * * *